INVENTORS
BERNARD DEVIN
JEAN-PAUL DURAND
ROBERT SCHLEY
BY Bacon & Thomas ATTORNEYS

United States Patent Office 3,414,966
Patented Dec. 10, 1968

3,414,966
PROCESS FOR JOINING DISSIMILAR METALS
Bernard Devin, Reuil-Malmaison, Jean-Paul Durand, Paris, and Robert Schley, Orly, France, assignors to Commissariat à l'Energie Atomique, Paris, France
Filed May 18, 1965, Ser. No. 456,719
Claims priority, application France, May 27, 1964, 975,955
5 Claims. (Cl. 29—528)

ABSTRACT OF THE DISCLOSURE

A composite unit consisting in a cylindrical steel member whose end is leak-tightly connected to an aluminum member is obtained by inserting the end of the cylindrical member in a molten aluminum mass, rotating the member about its axis for a time sufficient for the aluminum to wet the steel, and cooling and permitting at least part of the molten mass to solidify on the cylindrical member.

---

The present invention relates to leak-tight joints and has for its object a process for the formation of a leak-tight joint between a massive member of either pure or low-alloy aluminum and a substantially cylindrical member of a different metal or alloy and also, by way of novel industrial product, assemblies similar to those obtained as a result of the practical application of said process or a similar process.

One important application of the invention consists in providing a leak-tight joint which is sturdy and which offers resistance to thermal cycling, said joint being formed between a massive member of either pure or low-alloy aluminum and an elongated cylindrical member which may be either full or tubular and made of a metal or alloy which is markedly different from aluminum in respect of its coefficient of expansion or which cannot readily be wetted by aluminum.

Among the metals or alloys which have at least one of the properties referred to, stainless steel is especially noteworthy. In fact, the construction of mechanical assemblies frequently calls for the use of stainless steel and aluminum which cannot readily be joined by conventional methods of welding or brazing. Whenever it proved necessary to form such assemblies in the past, there were as a rule two solutions available. In one solution, the stainless steel member (usually a tube) was wetted by dipping in a bath of molten aluminum, whereupon the massive aluminum member was added to the wetted portion by arc welding or oxyacetylene welding. In the other solution, the stainless steel member and aluminum member were nickel-plated, then bonded by tin-soldering.

Both of these methods are subject to drawbacks. When the first method is employed, imperviousness to helium is very difficult to ensure since the wetting remains only partial. In regard to the second method, this latter does not make it possible to achieve satisfactory mechanical strength as well as satisfactory resistance to thermal cycling.

The present invention is directed to the basic concept of a process which meets practical requirements more effectively than has been the case in methods of the prior art. To this end, the invention proposes a process which consists in melting a mass of aluminum which is in the pure state or which contains small amounts of alloying elements, in inserting within the molten mass that portion of the cylindrical member which is to be joined to the aluminum, in causing the cylindrical member to rotate at high speed about its axis over a minimum predetermined period, in cooling the mass of aluminum and shaping said mass so as to form the massive member.

The movement of rotation of the cylindrical member ensures: more effective wetting of the cylindrical member by the aluminum as a result of the vibrations which always accompany the movement of rotation; brazing of the mass; and, as a result of the centrifugation produced, the discharge of impurities contained in the molten aluminum bath ($Al_2O_3$, $Fe_3Al$, etc. . . .) towards the surface, thereby purifying the molten mass and facilitating subsequent operations on said mass, in particular if it has to be welded.

One non-exclusive application of the invention consists in providing a connecting device between the end cap formed of an aluminum-base light alloy which closes the can of a nuclear fuel element and a stainless steel tube providing a passage for a measuring element (e.g. a thermocouple) which is intended to pass through the can. In such a case, it will be apparent that the joint must remain absolutely leak-tight in order to prevent the escape of radioactive fission products; the construction of the device by the method according to the invention accordingly entails a first stage wherein the stainless steel tube is joined to an aluminum member by carrying out the stages of operation hereinabove set forth, followed by a second stage which consists in welding or brazing the aluminum member to the light-alloy end cap. This operation can be performed without difficulty since the two materials to be joined have similar properties.

In the case of aluminum which is alone mentioned as a constituent of the massive member, there can be incorporated therewith a number of different additives with a view to improving its strength under particular operating conditions. In the case of the cylindrical member, this latter can be formed of various metals or alloys other than stainless steel, the only essential condition being that such metals must not form eutectic mixtures with aluminum or its additives: it is possible in particular to employ with aluminum a cylindrical member of titanium, of nickel, or of a number of different alloys containing a high proportion of nickel such as the nickel alloys which are designated by the registered trademarks "Monel" and "Inconel."

The invention will now be described with reference to particular examples of practical application which are not given in any limiting sense. The description refers to the accompanying drawings, in which.

Figure 1:
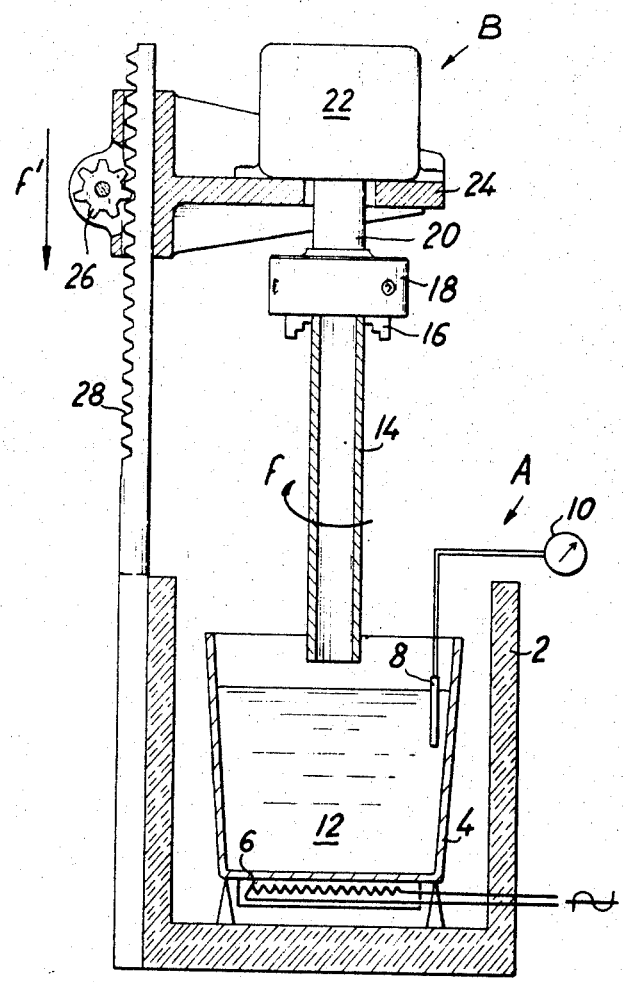
FIG. 1 shows very diagrammatically an apparatus for the application of the process according to the invention as represented in cross-section on a vertical plane.
Figure 2:
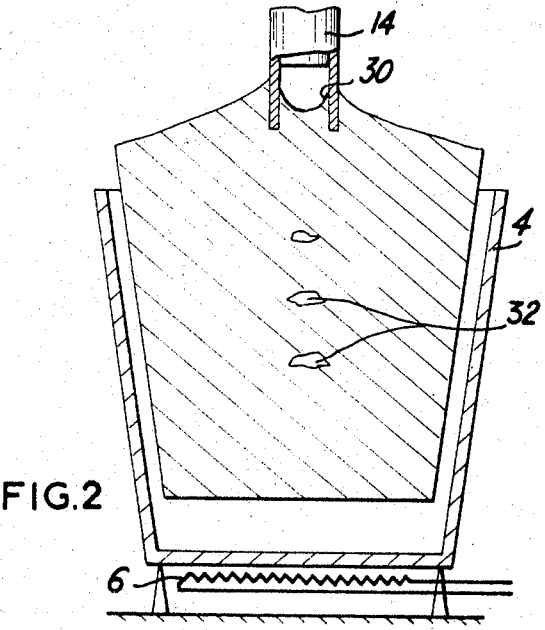
FIG. 2 shows diagrammatically on a large scale the ingot which is obtained on completion of the vacuum process.
Figure 4:
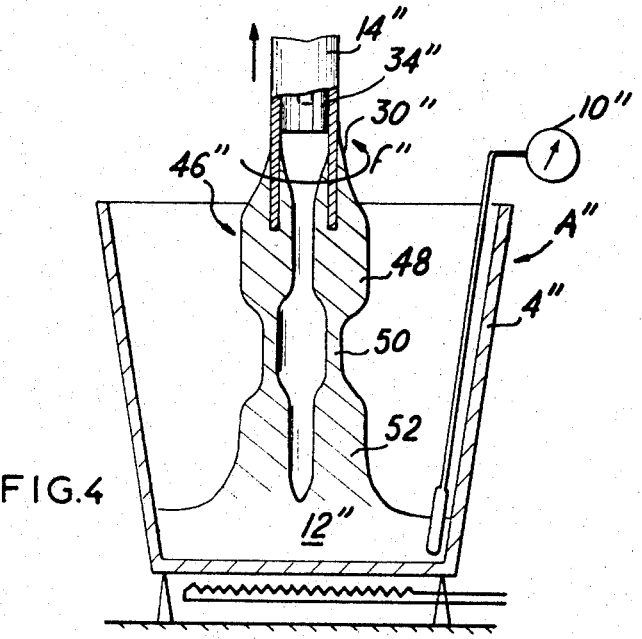
Figure 3:
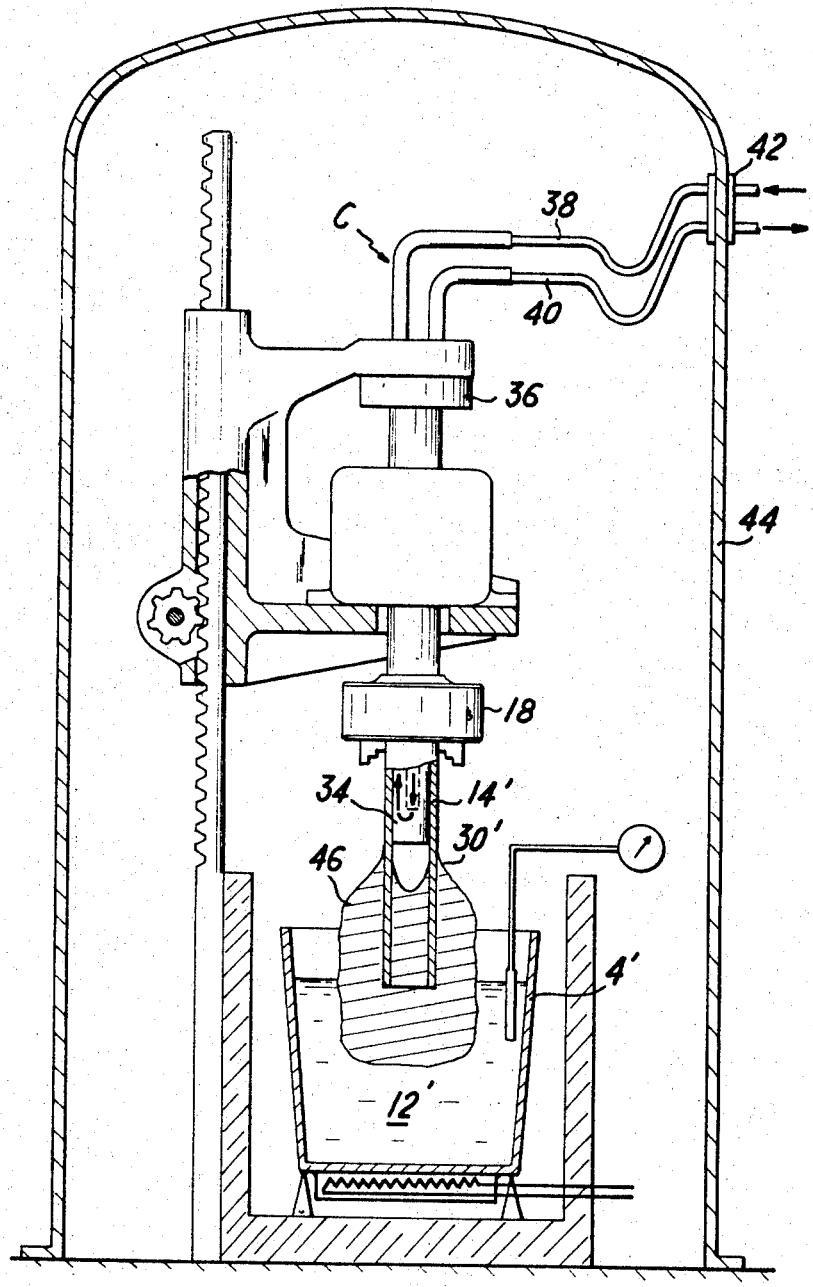

FIG. 3, which is similar to FIG. 1, shows an apparatus for the application of an alternative form of the process according to the invention;

FIG. 4, which is similar to FIG. 2, shows diagrammatically the ingot which is obtained after operation of the apparatus of FIG. 3.

The apparatus which is illustrated in FIG. 1 comprises a furnace A consisting of a vessel 2 and a crucible 4 which is disposed within said vessel and which is heated by an electric resistance 6. A thermocouple 8 which is connected to a measuring instrument 10 serves to determine the temperature of the aluminum bath 12 contained in the crucible 4.

The furnace which is illustrated in FIG. 1 is open to the outside air; the centrifugation which is produced by the operation of the process according to the present Application permits such a mode of operation inasmuch as it reduces the aluminum oxide produced. However, it is usually preferable to operate in a vacuum furnace or in an inert gas atmosphere.

There is associated with the furnace A a mechanism B which is intended to carry the cylindrical member to be attached to the mass 12 of molten aluminum contained in the crucible 4. The cylindrical member which is illustrated in the figure and which consists of a tube 14 of stainless steel is held between the jaws 16 of a chuck 18 which is secured to the shaft 20 of an electric motor 22 for the purpose of driving the chuck 18 and tube 14 in the direction of rotation which is indicated by the arrow $f$.

The motor 22 is carried by a plate 24 which any suitable device such as a rack and pinion drive system comprising a pinion 26 and a rack 28 serves to displace in the direction of the arrow $f'$ in order that said plate may thus either be lowered from the top position in which it is shown in the figure to a position in which the terminal portion of the tube 14 is immersed in the mass of aluminum 12, or returned upwardly to said top position.

The operation of the process consists of the following successive stages: the crucible 4, the transverse cross-section of which is preferably chosen so as to be similar to that of the massive member to be formed, is charged with an aluminum ingot having a mass which is chosen so as to correspond to the height of the solid member to be formed. The tube 14 is treated in such a manner as to assist the wetting thereof by the aluminum. The tube is simply degreased if the state of surface thereof is satisfactory; if not, the tube is machined on a lathe in order to increase its surface roughness and thus assist the attachment of the aluminum. The tube is set in position in the chuck in the position shown in the figure. The electric resistance 6 is supplied with current until the temperature of the bath reaches a value which is slightly higher than the melting point (660° C. in the case of unalloyed aluminum); a temperature of the order of 670° C. is usually acceptable.

The rack and pinion drive system is then actuated so as to lower the tube to the requisite depth within the mass 12 of molten aluminum; since said mass is maintained at a substantially constant temperature, the motor 22 is energized a number of times and at regular intervals over periods of the same order of duration in order to effect the wetting of the tube 14 by the aluminum. The movement of rotation must be carried out at a sufficiently high speed to ensure that the vibrations effect the satisfactory wetting and in order to eliminate the impurities. By way of indication, the process has been carried out by performing three rotations of one-minute duration at 120 r.p.m., with a time interval of 5 minutes between each rotation, in the case of a tube having an external diameter of the order of 28 millimeters.

On completion of the movements of rotation, the supply of current to the resistance 6 is cut off and the mass of aluminum thus cools and solidifies in the form of an ingot. During solidification and cooling of the mass, its shrinkage produces a binding or hooping action on the tube 14 which further improves the contact. The tube 14 and the ingot which are bonded to each other are then transferred to a machine-tool for machining of the assembly. This machining operation will consist, for example, in shaping the ingot so as to form the massive aluminum member, and in drilling-out the tube 14 so as to eliminate the molten aluminum which has solidified therein. It should further be noted that the shrinkage of the aluminum within the tube during the cooling process will facilitate the above-mentioned drilling operation.

The wetting of the stainless steel tube 14 by the molten aluminum is improved when all of the operations are carried out in vacuo. Accordingly, the ingot 29 obtained in the present instance has the shape illustrated in FIG. 2. From this figure, it can be seen that the top face of the mass is provided in that portion which is joined to the tube 14 with junction curves or blends 30 which ensure increased adhesion.

In certain cases, the mass 12 which is prepared in accordance with the process hereinabove described contains blow-holes 32 (as shown in FIG. 2) which are due to the shrinkage of the aluminum at the time of solidification. These flaws are wholly eliminated by virtue of an alternative form of operation which will now be described with reference to FIG. 3. For the sake of greater simplicity, corresponding parts of FIGS. 1 and 3 are given the same reference numerals to which is assigned the prime index in FIG. 3.

The apparatus which is illustrated in FIG. 3, and which is intended to perform the joining in vacuo of the tube 14' to a solid member fabricated from a mass 12' of either pure or low-alloy aluminum, is generally similar in design to that of the equipment unit shown in FIG. 1. However, this apparatus is equipped with a system C for effecting the powerful cooling of the tube 14'. The system C essentially comprises a sleeve 34 which is intended to be inserted in the tube and through which water is circulated; the water is supplied and discharged through a rotary coupling 36 connected to pipes 38 and 40 which pass through a leak-tight seal 42 in the bell-housing 44 which contains the entire apparatus.

The temperature of the molten aluminum mass 12' contained in the crucible 4' is maintained at a value which is slightly higher than the melting temperature of aluminum. A slight temperature difference of between 3 and 10° C. as a rule proves satisfactory.

The solidification of the aluminum accordingly takes place in a preferential manner on the steel tube 14' on cooling and there is thus formed an ingot 46 which thickens in a progressive manner. The ingot thus produced contains no blow-holes, adheres perfectly to the tube to be covered and its thickness can be regulated at will since it is merely necessary to withdraw the tube 14' from the molten mass 12' when the ingot 46 has reached the desired thickness. One advantage of this solution lies in the fact that another tube can be immediately introduced if a sufficient volume of molten aluminum remains within the crucible.

An additional improvement of the process can be carried into effect in the apparatus which is illustrated in FIG. 3 and makes it possible to produce an ingot having very elongated blends in the portion of the ingot which is joined to the tube. In accordance with this improvement as illustrated in FIG. 4, the tube 14" which is powerfully cooled through the sleeve 34" is caused to rotate continuously (at a lower speed than during the wetting phase) and at the same time lifted slowly as the ingot solidifies on the tube. Depending on the temperature of the bath and the intensity of cooling, the speed of the lifting movement can vary between 1 and 10 mm./min. in the majority of cases. As shown in FIG. 4, the tube which is thus subjected to an upward helical movement is covered with an aluminum ingot 46", the thickness of which is approximately inversely proportional to the speed of upward motion of the tube. It is thus possible to obtain rough casts of various shapes which nearly corresponds to the shape of the massive member to be subsequently formed by machining.

FIG. 4 shows a tube 14" which has successively been lifted rapidly so as to form a very elongated blend 30", then more slowly so as to form a massive portion 48, then again rapidly (after the entire tube has been covered) so as to form a necked portion 50 and, finally, more slowly so as to form a mass 52.

The advanages of this alternative form are now readily apparent. The presence of a very gradual blend 30" prevents any detachment and ensures both leak-tightness and resistance to thermal cycling; by making provision for a sufficient volume within the crucible 4", a number of tubes can be processed in succession; at no moment is the entire mass solidified within the crucible; subsequent machining is simplified and a tubular ingot can even be obtained directly.

By way of example, tubular members of stainless steel a few millimeters in diameter have been joined by this process to an aluminum member which was intended for use as a joint providing a connection with a light alloy tube. After wetting, which is effected by rotation at 120 r.p.m., the mass is maintained at a temperature which is higher than the melting point by 5° C.; the cooling system is set in operation and the tube is subjected at the same time to a movement of vertical translation at 5 mm./min. and to a movement of rotation at 60 r.p.m.

It will be clearly understood that this invention is not limited in any sense to the modes of operation which have been illustrated and described and that the scope of this patent extends to all such alternative forms of all or a part of the process and device hereinabove described as are considered to come within the definition of equivalent means.

What we claim is:

1. Process for the formation of a leak-tight joint between a massive member of either pure or low-alloy aluminum and a substantially cylindrical member of a different metal or alloy, said process comprising the steps of melting a mass of aluminum which is in the pure state or which contains small amounts of alloying elements, inserting into the molten mass that portion of the cylindrical member which is to be joined to the aluminum, rotating the cylindrical member at high speed about its axis over a minimum predetermined period, cooling and permitting to solidify on said member part at least of the mass of aluminum and shaping said mass so as to form the massive member.

2. Process in accordance with claim 1, wherein said cylindrical member is cooled while inserted into said molten mass and the molten mass is maintained at a temperature which is a few degrees higher than the melting point so as to form said massive member.

3. Process in accordance with claim 2, wherein said cylindrical member is simultaneously rotated and moved upward during the formation of the massive member.

4. Process in accordance with claim 3, wherein the cylindrical member is moved upwardly at variable speed with a view to producing a variation in the radial dimension of the solidified mass along the length thereof.

5. Process in accordance with claims 1 comprising the additional step of securing said massive member either by welding or brazing to a nuclear reactor fuel element end cap which is formed of either pure or low-alloy aluminum.

References Cited

UNITED STATES PATENTS

| 873,979 | 12/1907 | Zimmerman. | |
|---|---|---|---|
| 1,834,444 | 12/1931 | Bock | 29—475 |
| 3,078,515 | 12/1963 | Patriarca et al. | 29—475 X |

JOHN J. CAMPBELL, *Primary Examiner.*

PAUL M. COHEN, *Assistant Examiner.*

U.S. Cl. X.R.

29—475; 121—68; 29—529; 121—68